US010485053B1

(12) United States Patent
Harris

(10) Patent No.: US 10,485,053 B1
(45) Date of Patent: Nov. 19, 2019

(54) METHOD AND APPARATUS FOR PRE-EMPTING EVOLVED NODE B CONTROL PLANE COLLISIONS

(71) Applicant: NOKIA SOLUTIONS AND NETWORKS OY, Espoo (FI)

(72) Inventor: John Harris, Whitefish Bay, WI (US)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 0 days.

(21) Appl. No.: 16/015,866

(22) Filed: Jun. 22, 2018

(51) Int. Cl.
| | |
|---|---|
| H04W 72/00 | (2009.01) |
| H04W 76/45 | (2018.01) |
| H04W 4/10 | (2009.01) |
| H04W 76/27 | (2018.01) |
| H04W 76/25 | (2018.01) |
| H04W 76/50 | (2018.01) |
| H04W 4/90 | (2018.01) |

(52) U.S. Cl.
CPC ............. *H04W 76/45* (2018.02); *H04W 4/10* (2013.01); *H04W 76/25* (2018.02); *H04W 76/27* (2018.02); *H04W 4/90* (2018.02); *H04W 76/50* (2018.02)

(58) Field of Classification Search
CPC ..... H04W 76/50; H04W 76/25; H04W 76/27; H04W 4/90; H04W 4/10
USPC ............... 455/450, 574, 437, 436, 501, 522
See application file for complete search history.

(56) References Cited

U.S. PATENT DOCUMENTS

| | | | |
|---|---|---|---|
| 6,871,074 B2 | 3/2005 | Harris et al. | |
| 7,139,246 B2 | 11/2006 | Harris et al. | |
| 8,254,976 B2 | 8/2012 | Harris | |
| 9,883,446 B2 | 1/2018 | Gupta et al. | |
| 2011/0255407 A1* | 10/2011 | Ishii | H04W 28/02 370/235 |
| 2012/0060158 A1* | 3/2012 | Kadous | H04W 72/1215 718/100 |
| 2013/0003678 A1* | 1/2013 | Quan | H04W 72/04 370/329 |
| 2013/0250771 A1* | 9/2013 | Yu | H04W 76/14 370/241 |
| 2014/0313902 A1* | 10/2014 | Bruner | H04W 28/0236 370/238 |
| 2017/0019820 A1* | 1/2017 | Das | H04W 36/0016 |
| 2017/0331577 A1* | 11/2017 | Parkvall | H04J 11/0079 |
| 2017/0331670 A1* | 11/2017 | Parkvall | H04J 11/0079 |
| 2018/0213577 A1* | 7/2018 | Burbidge | H04W 76/10 |

FOREIGN PATENT DOCUMENTS

WO    WO-2017017716 A1 *  2/2017  ............. G06F 17/50

* cited by examiner

*Primary Examiner* — Joseph Arevalo
(74) *Attorney, Agent, or Firm* — Kramer Amado, P.C.

(57) ABSTRACT

Various embodiments relate to a method and apparatus for preempting simultaneous control plane ("C-Plane") load collisions from simultaneous user equipment ("UE") releases on a group call, the method including the steps of determining, by an Evolved Node B ("eNB"), whether at least one of a plurality of UEs has data activity, determining, by the eNB, whether a simultaneous C-Plane simultaneous UE release condition has been met and setting, by the eNB, an inactivity timer countdown value for each of the plurality of UEs using randomized values over a first time interval for the inactivity timer countdown value.

20 Claims, 6 Drawing Sheets

METHOD AND APPARATUS FOR PRE-EMPTING EVOLVED NODE B CONTROL PLANE COLLISIONS

TECHNICAL FIELD

This disclosure relates generally to capacity limitations of the Evolved Node B ("eNB"), and more specifically, but not exclusively, to a mechanism to improve the overall mission-critical push to talk ("PTT") performance.

BACKGROUND

Capacity limitations of an eNB exist in a public safety group PTT call model. eNB implementations have limitations with respect to the number of simultaneous call initiations which can be processed by the eNB for a time period (e.g., within one second), such that the maximum number of user equipment ("UE") within the same group call within the same cell (or half C-Plane pool) may need to be less than for example 100 UEs, otherwise a capacity limit will be reached and access class barring will more likely be triggered.

SUMMARY

A brief summary of various embodiments is presented below. Embodiments address a method and apparatus for pre-empting eNB control plane collisions.

A brief summary of various example embodiments is presented. Some simplifications and omissions may be made in the following summary, which is intended to highlight and introduce some aspects of the various example embodiments, but not to limit the scope of the invention.

Detailed descriptions of example embodiments adequate to allow those of ordinary skill in the art to make and use the inventive concepts will follow in later sections.

Various embodiments relate to a method for preempting simultaneous control plane ("C-Plane") load collisions from simultaneous user equipment ("UE") releases on a group call, the method including the steps of determining, by an Evolved Node B ("eNB"), whether at least one of a plurality of UEs has data activity, determining, by the eNB, whether a simultaneous C-Plane simultaneous UE release condition has been met for the plurality of UEs and setting, by the eNB, an inactivity timer countdown value for each of the plurality of UEs using randomized values over a first time interval for the inactivity timer countdown value.

In an embodiment of the present disclosure, the method for preempting simultaneous C-Plane load collisions from simultaneous UE releases on a group call, the method further including the step of setting, by the eNB, the inactivity timer countdown value for each of the plurality of UEs using non-randomized values allowing simultaneous release of the plurality of UEs.

In an embodiment of the present disclosure, the method for preempting simultaneous C-Plane load collisions from simultaneous UE releases on a group call, the method further including the step of determining, by the eNB, whether the inactivity timer has expired for each of the plurality of UEs and initiating, by the eNB, release of each of the plurality of UEs which have inactivity timers which have expired.

In an embodiment of the present disclosure, the method for preempting simultaneous C-Plane load collisions from simultaneous UE releases on a group call, the method further including the step of determining, by an eNB, whether at least one of the plurality of UEs have data activity when the inactivity timer for each of the plurality of UEs have not expired.

In an embodiment of the present disclosure, the simultaneous C-Plane simultaneous UE release condition is when the plurality of UEs which have data activity is greater than a threshold value.

In an embodiment of the present disclosure, the simultaneous C-Plane simultaneous UE release condition is when the plurality of UEs are utilizing a plurality of cells which are all served by a C-Plane processing pool.

In an embodiment of the present disclosure, the simultaneous C-Plane simultaneous UE release condition is when the plurality of UEs have had data activity within a time interval.

In an embodiment of the present disclosure, the time interval is less than 500 milliseconds.

In an embodiment of the present disclosure, setting an inactivity timer countdown value for each of the plurality of UEs using randomized values for the inactivity timer countdown value is set by an application server to stagger release times for each of the plurality of UEs.

In an embodiment of the present disclosure, the inactivity timer countdown value uses randomized values over a second time interval which is greater than a first time interval, when detecting a second group call.

Various embodiments relate to an Evolved Node B ("eNB") for preempting simultaneous control plane ("C-Plane") load collisions from simultaneous user equipment ("UE") releases on a group call, the eNB including a memory and a processor configured to determine whether at least one of a plurality of UEs has data activity, determine whether a simultaneous C-Plane simultaneous UE release condition has been met and set an inactivity timer countdown value for each of the plurality of UEs using randomized values over a first time interval for the inactivity timer countdown value.

In an embodiment of the present disclosure the processor is further configured to set the inactivity timer countdown value for each of the plurality of UEs using non-randomized values allowing simultaneous release of the plurality of UEs.

In an embodiment of the present disclosure, the processor is further configured to determine whether the inactivity timer has expired for each of the plurality of UEs and initiate release of each of the plurality of UEs which have inactivity timers which have expired.

In an embodiment of the present disclosure the processor is further configured to determine whether at least one of the plurality of UEs have data activity when the inactivity timer for each of the plurality of UEs have not expired.

In an embodiment of the present disclosure, the simultaneous C-Plane simultaneous UE release condition is when the plurality of UEs which have data activity is greater than a threshold value.

In an embodiment of the present disclosure, the simultaneous C-Plane simultaneous UE release condition is when the plurality of UEs are utilizing a plurality of cells which are all served by a C-Plane processing pool.

In an embodiment of the present disclosure, the simultaneous C-Plane simultaneous UE release condition is when the plurality of UEs have had data activity within a time interval.

In an embodiment of the present disclosure, the time interval is less than 500 milliseconds.

In an embodiment of the present disclosure, setting an inactivity timer countdown value for each of the plurality of UEs using randomized values for the inactivity timer countdown value is set by an application server to stagger release times for each of the plurality of UEs.

In an embodiment of the present disclosure, the inactivity timer countdown value uses randomized values over a second time interval which is greater than a first time interval, when detecting a second group call.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate example embodiments of concepts found in the claims, and explain various principles and advantages of those embodiments.

These and other more detailed and specific features are more fully disclosed in the following specification, reference being had to the accompanying drawings, in which.

DETAILED DESCRIPTION

Figure 1:
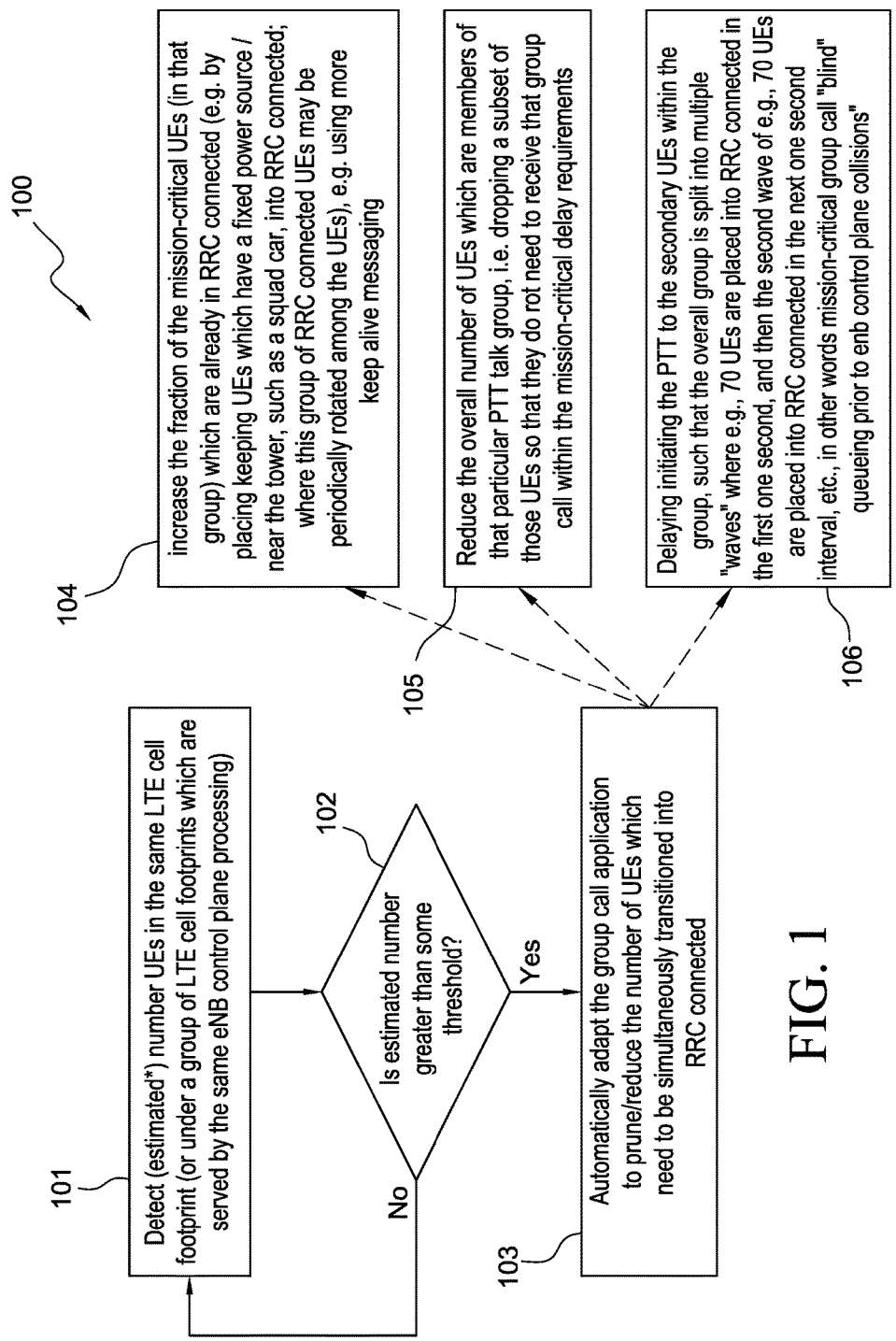
FIG. 1 illustrates a flow diagram for a method for handling a greater number of UEs than a threshold under the same eNB C-Plane in the current embodiment.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable.

The current embodiment is directed towards a mechanism to improve the overall mission-critical PTT performance by using mission critical group call blind queuing to pre-empt eNB C-Plane collisions and randomizing inactivity timers to ensure timely missing critical PTT to call services.

If an application initiates a large group call, for example, a group call larger than 100 UEs, where more than a threshold number, for example, 70 UEs are all located under a single Long Term Evolution ("LTE") cell footprint (or under a group of LTE cell footprints which are served by the same eNB control plane processing) then a limitation may be encountered with respect to the eNBs ability to process each of the UEs in the large group call within the next approximately one second, which is required by the mission-critical key performance indicators ("KPIs").

By allowing UEs to remain radio resource control ("RRC") connected to the eNB may result in reduced UE battery life and efficiency and increased radio frequency ("RF") resource usage.

Utilizing MBMS for mission-critical PTT to avoid the need to place all UEs into RRC connected mode may also address the issue, however, implementing MBMS for mission-critical PTI is complicated and may encounter other limitations.

In the event that a single inactivity timer is utilized across a group call, that single inactivity timer may result in all UEs within that large group call transitioning from RRC connected mode to RRC idle mode, within a short time interval, for example, less than one second, because the time of the last data activity for most, if not all, of the UEs within the large group call may all finished at the same time (i.e., when they all listen to the last person to speak with that large group call).

An embodiment will be described herein that solves the problem of all UEs being released at the same time, which causes a correlated Control Plane ("C-Plane") loading event.

As a result, C-Plane processing for these mission-critical UEs may cause the C-Plane to overload. When considering the commercial UE traffic, such that access class barring is initiated, this may negatively impact the commercial UE experience. Further, when considering the other mission-critical group call initiations, the KPIs for those mission-critical call setups may be negatively impacted.

Current existing solutions to prevent C-Plane collisions and overload do not address utilizing a randomization approach to selectively randomize the activity timer (e.g., when that UE is associated with a (mission-critical) PTT call). These existing solutions do not address using blind queuing to preempt C-Plane collisions.

If the mission-critical application detects more than a threshold number of UEs which are all in the same LTE cell footprint or under a group of LTE cell footprints which are served by the same eNB control plane processing, then the mission-critical application, on the server and/or UEs side may use one of the following methods to avoid eNB control plane overload and collisions. The server and/or UEs may automatically adapt the group call application to reduce the number of UEs which need to be simultaneously transitioned into RRC connected mode by either increasing the fraction of the mission-critical UEs (in that group call application) which are already in RRC connected mode (e.g., by keeping UEs which have a fixed power source and/or are near the tower, for example, a police or emergency services vehicle into RRC connected, where this group of RRC connected UEs may be periodically rotated among the UEs (i.e., using more keep alive messaging). Second, the server and/or UEs may reduce the overall number of UEs which are members of that particular PTT talk group (i.e., dropping a subset of those UEs in order for them not to need to receive that group call within the mission-critical delay requirements). Finally, the server and/or UEs may delay initiating the PTT to the secondary UEs within the group, such that the overall group is split into multiple "waves" where approximately 70 UEs are placed into RRC connected mode in the first second, and then the second wave of approximately 70 UEs are placed into RC connected mode in the second one second interval, etc. until all UEs have been split into multiple waves.

The current embodiment addresses the issue of where a mission-critical PTT is initiated to a group and the mission-critical PTI key performance indicator ("KPI") is not met, for example, where the key subset of the UEs within that group do not receive the PTT within that KPI by allowing the mission-critical application server to preemptively avoid encountering the C-Plane limitation.

Other solutions such as keeping UEs RRC connected may address the issue, however, it may also result in battery life and RF resource usage.

Utilizing MBMS for mission-critical PTT to avoid the need to place all UEs into RRC connected mode may also address the issue, however, implementing MBMS for mission-critical PTI is complicated and may encounter other limitations.

Further, network functions virtualization ("NFV") may also address the issue by reducing this magnitude of the C-plane resource bottleneck, however, a low latency virtualization may be difficult and may open up the mission critical network to other security concerns.

FIG. 1 illustrates a flow diagram for a method 100 for handling a greater number of UEs than a threshold under the same eNB C-Plane in the current embodiment.

The method 100 begins at step 101 which detects an estimated number of UEs in the same LTE cell footprint or under a group of LTE cell footprints which are served by the same eNB control plane processing. For example, if a UE is 50% likely in cell 1 or cell 2, then it may be counted as 0.5 UEs in each of cell 1 and cell 2.

The method 100 then proceeds to step 102 which determines whether the estimated number of UEs in the same LTE cell footprint or under a group of LTE cell footprints which are served by the same eNB control plane processing is greater than a threshold. If no, the method 100 proceeds to step 101. If yes, the method 100 proceeds to step 103 which automatically adapts the group call application to reduce the number of UEs which need to be simultaneously transitioned into RRC connection. The method may select one of three methods for reducing the number of UEs which need to be simultaneously transitioned into RRC connections.

In the current embodiment, the method 100 may increase the fraction of mission-critical UEs which are already in RRC connected mode 104, for all of the UEs which are relatively insensitive to battery life, for example, have a fixed power source. This may avoid the C-Plane bottleneck for these UEs without increasing the delay for these UEs, and the additional battery life drain for these UEs is less critical because of their fixed power source. However, in this embodiment, the method 100 may be selectively used based upon the detection of the simultaneous C-Plane loading event.

If even after increasing the fraction of mission-critical UEs which are already in RRC connected mode, the number of UEs is sufficiently large that not all of them can be immediately satisfied, the method 100 proceeds to delay initiating the PTT to the secondary UEs within the group, such that the overall group is split into multiple "waves" 106.

If even after delay initiating the PTT to the secondary UEs within the group, such that the overall group is split into multiple "waves" 106, the C-Plane loading is still estimated to be likely exceeded, then the mechanism may proceed to reduce the overall number of UEs which are members of that particular PTI tall group 105.

In another embodiment, the method 100 may use 105 and 106 simultaneously, i.e., where the UEs within the group go are separated into waves, with the higher priority UEs addressed in the earlier waves, where furthermore some subset of the UEs which would be and the latter waves would not satisfy a PTT setup delay requirement and as result are automatically determined to be dropped from that group call.

The method 100 may proceed to step 104 which increases the fraction of the mission-critical UEs (in that group) which are already in RRC connected mode (e.g., by keeping UEs which have a fixed power source or are near a tower (i.e., such a police car) into RRC connected where this group of RRC connected UEs may be periodically rotated among the group of UEs (e.g., using more keep alive messaging).

The method 100 may proceed to step 105 which reduces the overall number of UEs which are members of that particular PTI talk group (i.e., dropping a subset of those UEs so that they do not need to receive that group call within the mission-critical delay requirements). This may be accomplished by identifying which of the UEs in the PTT talk group have lesser strict PTT KPIs delay requirements, i.e. that may be able to tolerate being dropped and the connection being attempted later.

The method 100 may proceed to step 106 which delays initiating the PTT to the secondary UEs within the group such that the overall group is split into multiple "waves" where approximately 70 UEs are placed into RRC connected mode in the first second and then the second wave of approximately 70 UEs are placed into RRC connected in the next one second interval, etc., which is the action of blind queuing prior to eNB C-Plane collisions. Note, that the example of 70 UEs could be a different number depending upon the processing capability of the affected eNB control plane processing.

In the current embodiment, step 101 which detects more than a threshold number of UEs are all in the same LTE cell footprint (or under a group of LTE cell footprints which are served by the same eNB control plane processing) may be achieved by the mission-critical application server which may routinely track the approximate location of all of the public safety UEs at an application level.

The mission-critical application server may be configured to be notified as to which LTE cell footprints are serviced by the same eNB control plane processing unit.

When there is an ambiguity with respect to the location of one or more of the UEs, then a probabilistic estimate of the location of that the UE may be within each cell may be utilized to calculate the expected, anticipated or approximate number of UEs within that group within that particular LTE cell footprint.

Figure 2:
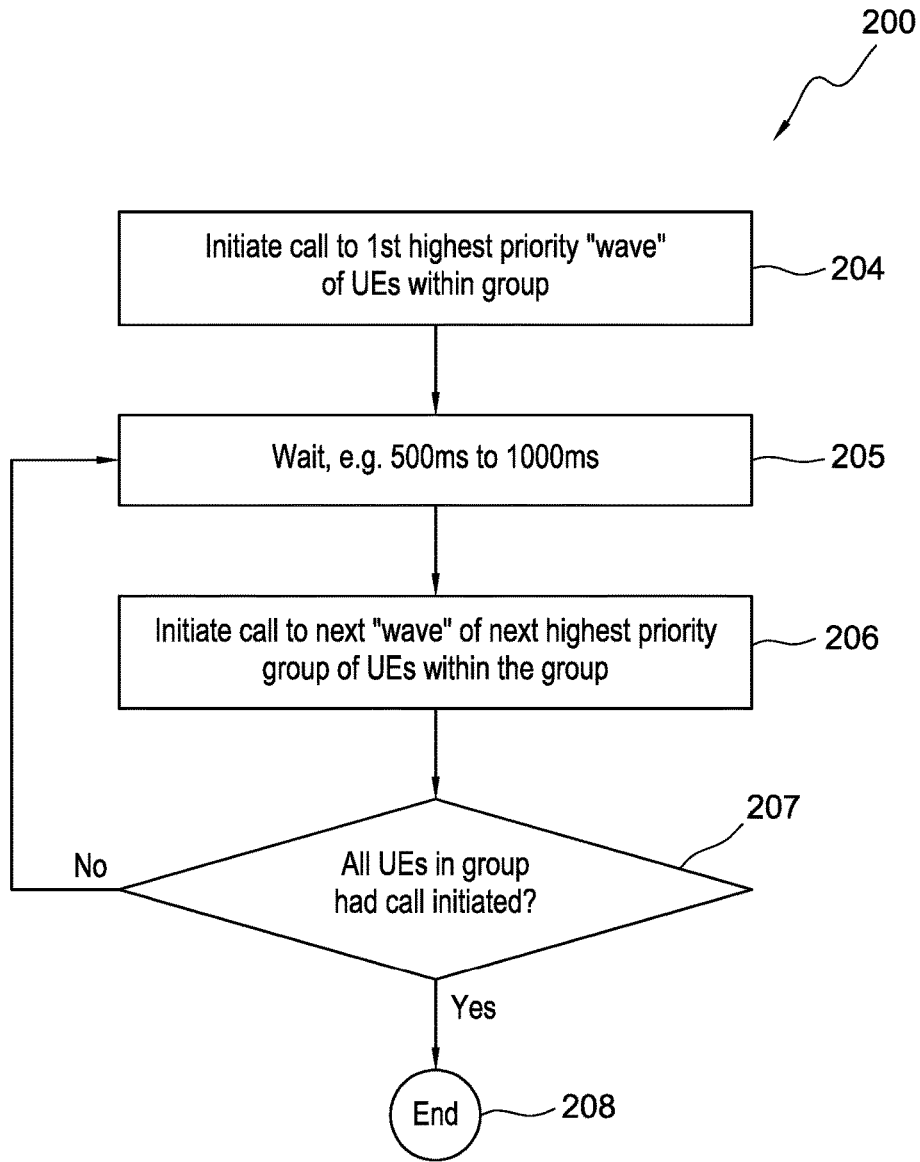
FIG. 2 illustrates a flow diagram for a method for handling a greater number of UEs than a threshold under the same eNB C-Plane in the current embodiment.

FIG. 2 illustrates a flow diagram for a method 200 for handling a greater number of UEs than a threshold under the same eNB C-Plane in the current embodiment.

The method 200 may implement step 106 from method 100 in FIG. 1.

The method 200 proceeds from step 204 which initiates a call to a first highest priority "wave" of UEs within the group call.

The number of attempts per second is limited such that the number of UEs per wave per seconds is equal to approximately 100 per second (in this example, but other values may be used based upon the specific eNB C-plain processing capability), e.g. where approximately three cells connected to the same C-Plane pool.

The method 200 then proceeds to step 205 which waits for a period of time before initiating a call to the next "wave" of UEs. For example, the period of time may be 500 milliseconds to 1000 milliseconds.

The method 200 then proceeds to step 206 which initiates a call to the next "wave" of the next highest priority group of UEs within the group.

The method 200 then proceeds to step 207 which determines whether all of the UEs within the group have had the call initiated. If yes, the method 200 proceeds to end at step 208. If no, the method proceeds to step 205.

Figure 3:
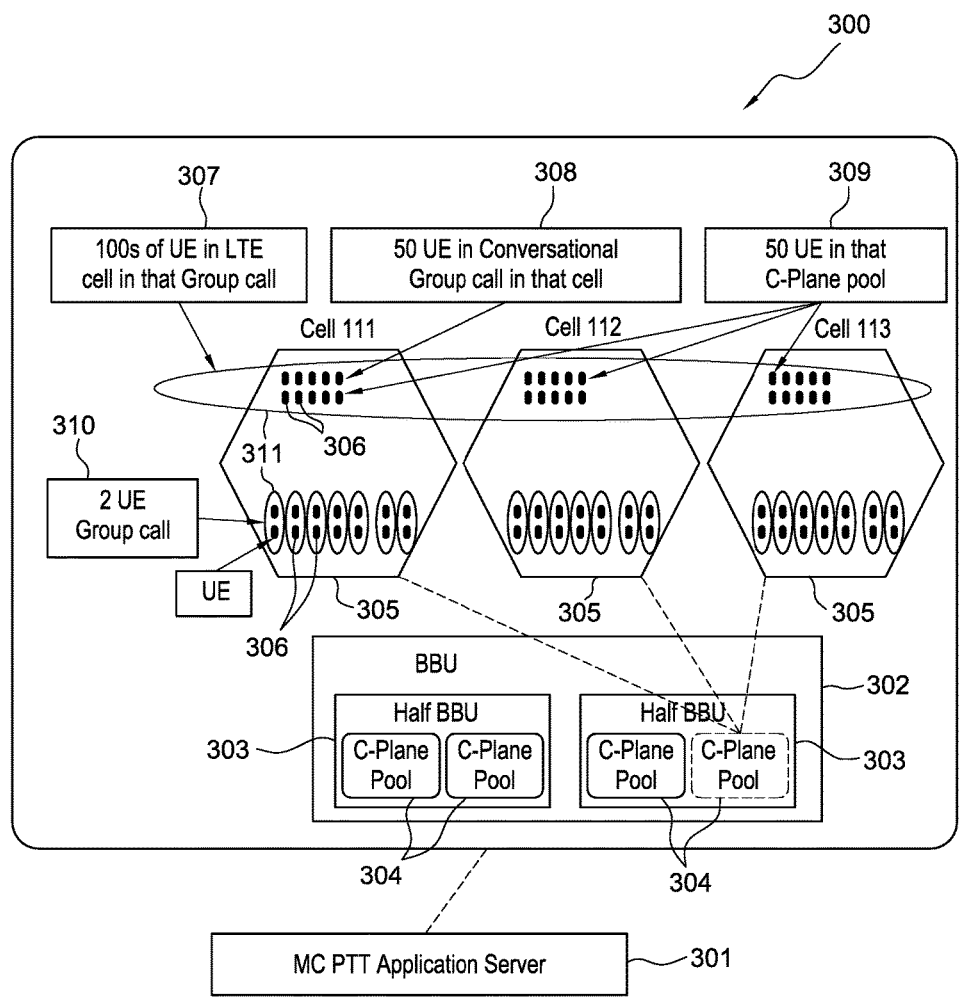
FIG. 3 illustrates a block diagram of a system 300 including PTT Application Server, a base band unit ("BBU") and LTE cells for the current embodiment.

FIG. 3 illustrates a block diagram of a system 300 including PTT Application Server 301, a base band unit ("BBU") 302 and LTE cells 305 for the current embodiment.

The PTT Application Server 301 is aware of when a group call is placed and the PTI Application Server 301 sends data packets to the UEs 306 to initiate the group call 311. The PTT Application Server 301 may also be aware of the location of the UEs 306 and which LTE cells 305 they are connected.

The PTT Application Server 301 cannot initiate a group call 311 to a number of UEs 306 greater than a threshold number within the same second. It may select the highest priority UEs 306 or stagger the initiation of UEs 306 in the group call 311.

For example, there may be 100s of UEs in an LTE cell 305 in a group call 307, there may be 50 UEs in a conversational group call 308, there may be 50 UEs in the C-Plane processing pool 309 and there may be 2 UEs in a group call 310.

The BBU 302 is a single device which connects multiple cellular towers, for example, LTE cells 305. The number of LTE cells 305 in the system 300 may vary.

Each of the LTE cells 305 include UEs which are connected to that LTE cell 305. Each of the LTE cells 305 utilize the same C-Plane processing pool 304. The UEs 306 may belong to a group call 311.

Each of the LTE cells may belong to the same C-Plane processing pool. For example, LTE cells 305 may all belong to C-Plane processing pool 304.

Figure 4:
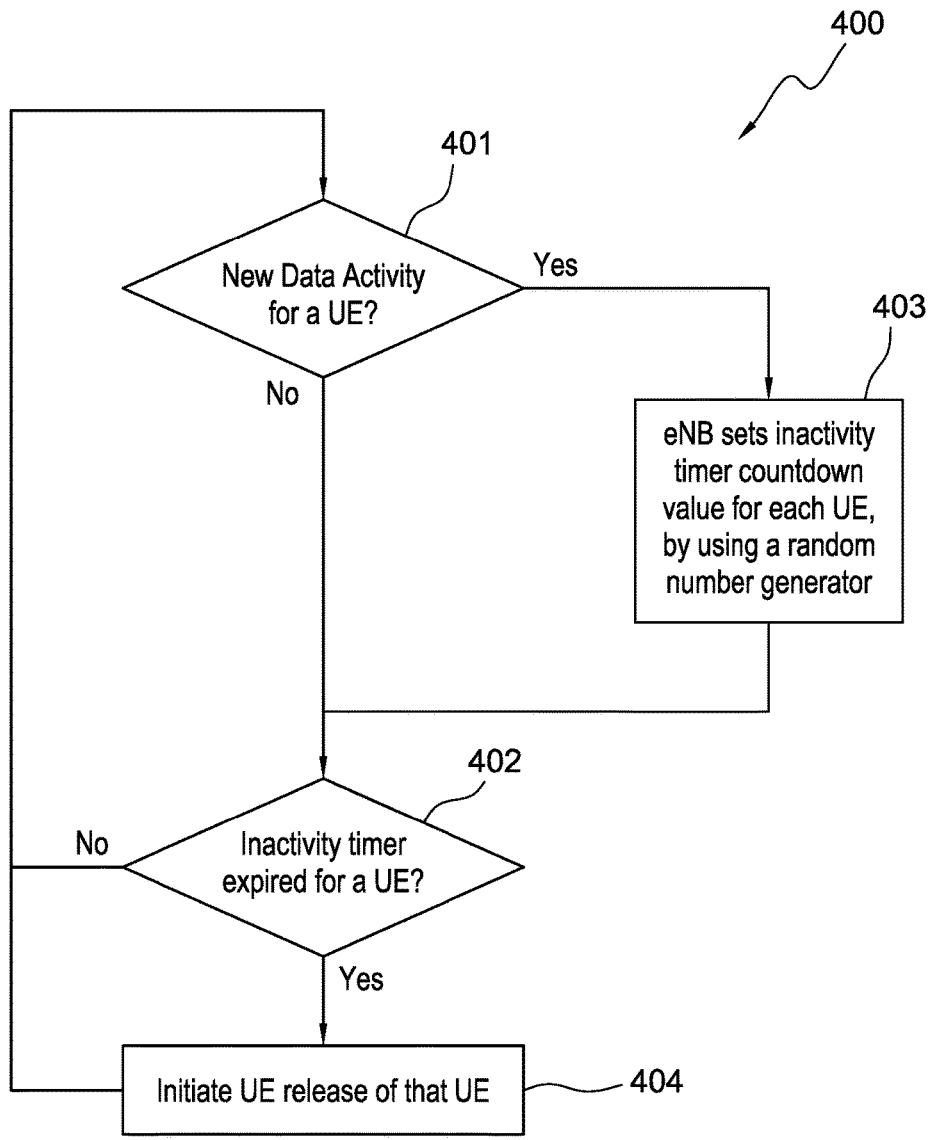
FIG. 4 illustrates a flow diagram for a method for randomizing an inactivity timer to ensure timely mission-critical PTT to many call services of the current embodiment.

FIG. 4 illustrates a flow diagram 400 for a method for randomizing an inactivity timer to ensure timely mission-critical PTT to many call services of the current embodiment.

The method 400 begins at step 401 which determines whether there is new data activity for a UE. If no, the method 400 proceeds to step 402 which determines whether the inactivity times has expired for a UE. If yes, the method 400 proceed step 403 where the eNB sets the inactivity timer countdown value for each UE by using a random number generator.

The method 400 then proceeds to step 402 which determines whether the inactivity timer has expired for the UE.

If yes, the inactivity timer has expired for a UE then the method 400 proceeds to step 404 which initiates a UE release of that UE. The method 400 then proceeds to step 401. If no, the method 400 proceeds to step 401.

Figure 5:
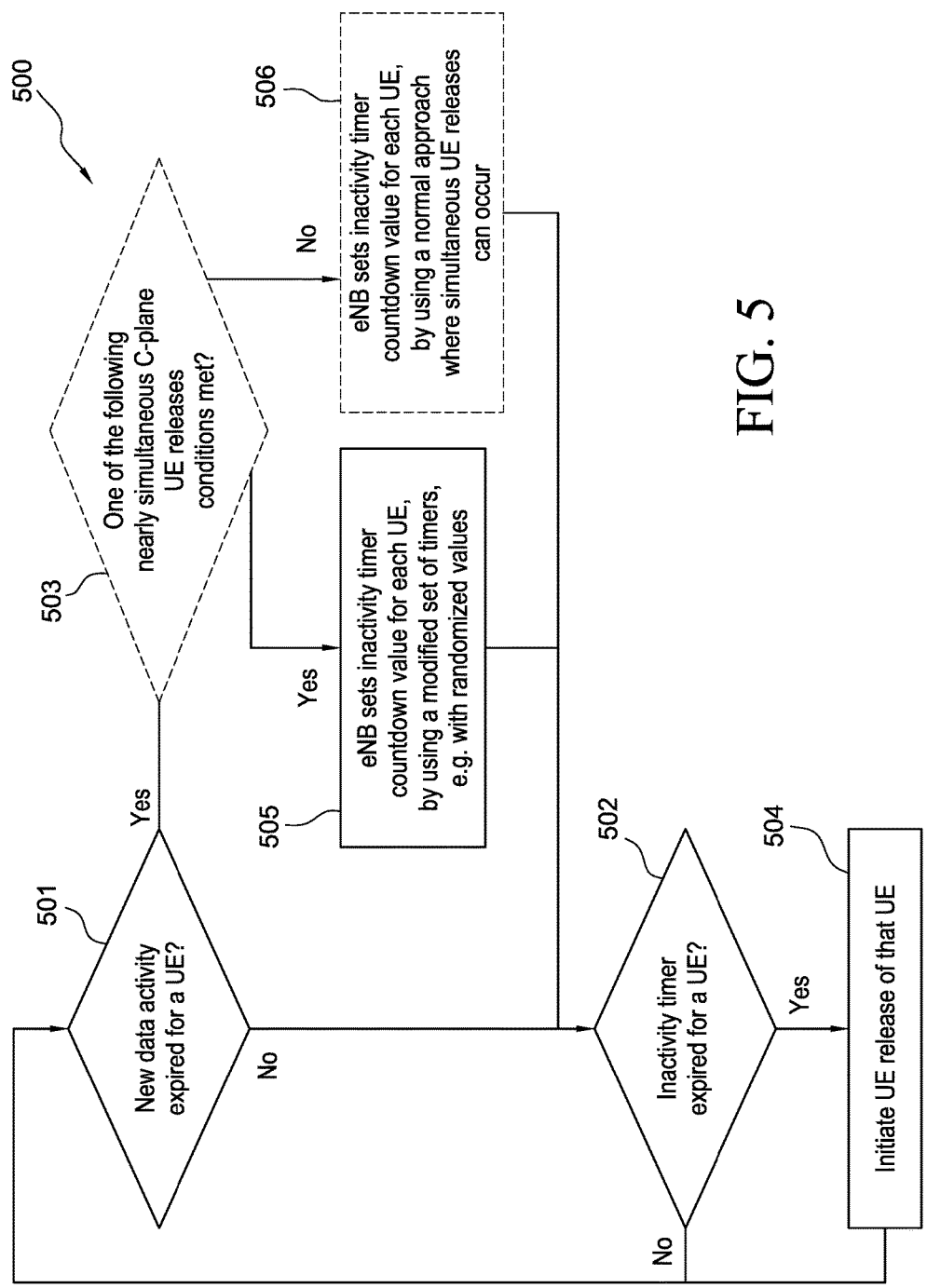
FIG. 5 illustrates a flow diagram for a method for randomizing an inactivity timer to ensure timely mission-critical PTT to many call services of the current embodiment.

FIG. 5 illustrates a flow diagram 500 for another method for randomizing an inactivity timer to ensure timely mission-critical PTT to many call services of the current embodiment.

The method 500 begins at step 501 which determines whether there is new data activity for a UE. If no, the method 500 proceeds to step 502 which determines whether the inactivity times has expired for a UE. If yes, the method 500 proceeds to step 503 which determines whether a condition for nearly simultaneous C-Plane UE release has been met. The nearly simultaneous C-Plane UE release conditions may include the following: where more than a threshold number of UEs within the synchronized group of UEs, for example, more than 10 UEs had their most recent data activity all within a short time interval (e.g., within less than 100 milliseconds); where the UEs are part of a mission-critical group or PTT call, for example, where UEs are receiving nearly simultaneous push notifications for a group e-mail which may otherwise all release the RF channel and transition to RRC idle mode nearly simultaneously which creates the problem for mission-critical PTT initiations; and where these UEs are under the same LTE cell footprint or under a group of LTE cell footprints which are served by the same eNB C-Plane processing.

If one of the three conditions are met, the method 500 proceeds to step 505 where the eNB sets an inactivity countdown timer for each UE by using a modified set of timers, for example, with randomized values. If no, the method 500 proceeds to step 506 where the eNB sets an inactivity timer countdown value for each UE by using a normal approach where nearly simultaneous UE releases may occur.

The method 500 then proceeds to step 502 which determines whether the inactivity times has expired for a UE. If yes, the method 500 proceeds to step 504 which initiates release of that UE and then proceeds back to step 501. If no, the method 500 proceeds to step 501.

Figure 6:
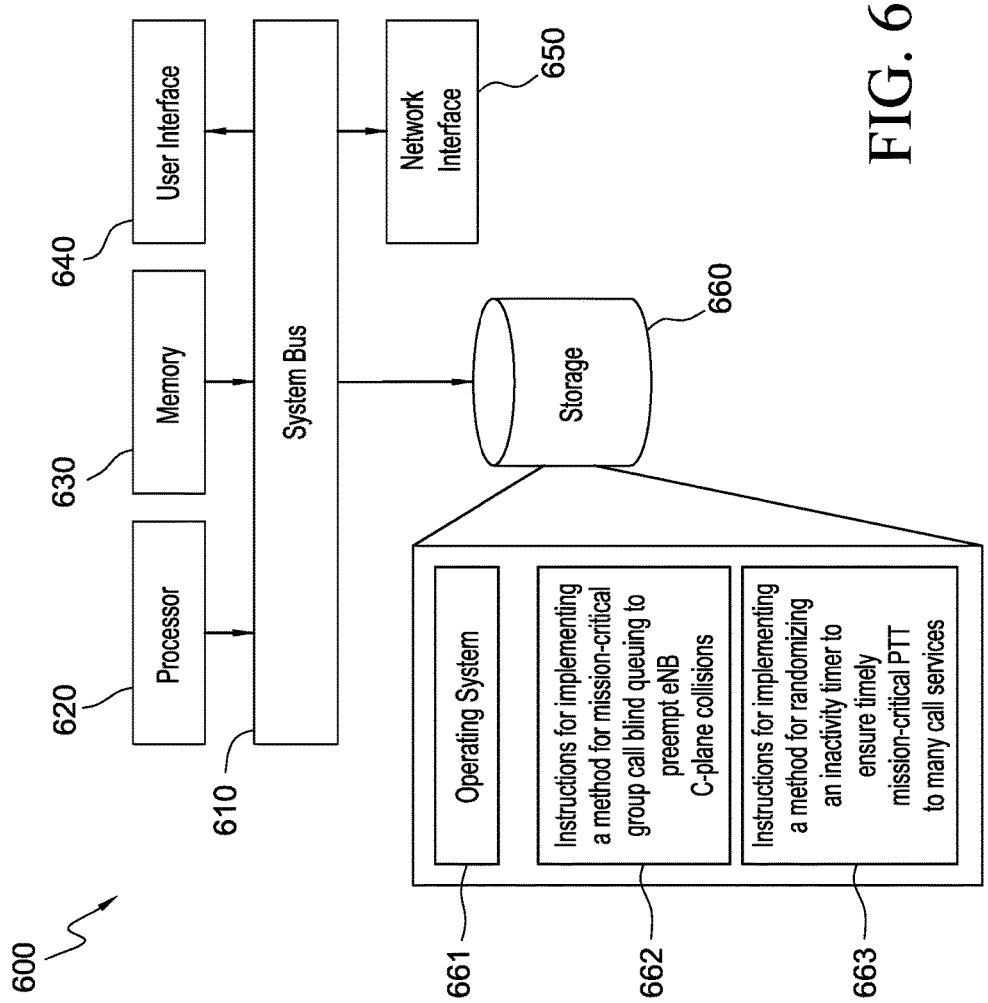
FIG. 6 illustrates a block diagram of a real-time data processing system of the current embodiment.

FIG. 6 illustrates an exemplary hardware diagram 600 for implementing a source node or a router. As shown, the device 600 includes a processor 620, memory 630, user interface 640, network interface 650, and storage 660 interconnected via one or more system buses 610. It will be understood that FIG. 6 constitutes, in some respects, an abstraction and that the actual organization of the components of the device 600 may be more complex than illustrated.

The processor 620 may be any hardware device capable of executing instructions stored in memory 630 or storage 660 or otherwise processing data. As such, the processor may include a microprocessor, field programmable gate array (FPGA), application-specific integrated circuit (ASIC), or other similar devices.

The memory 630 may include various memories such as, for example L1, L2, or L3 cache or system memory. As such, the memory 630 may include static random access memory (SRAM), dynamic RAM (DRAM), flash memory, read only memory (ROM), or other similar memory devices.

The user interface 640 may include one or more devices for enabling communication with a user such as an administrator. For example, the user interface 670 may include a display, a mouse, and a keyboard for receiving user commands. The user interface may also include touch or gesture controlled devices. In some embodiments, the user interface 640 may include a command line interface or graphical user interface that may be presented to a remote terminal via the network interface 650.

The network interface 650 may include one or more devices for enabling communication with other hardware devices. For example, the network interface 650 may include a network interface card (NIC) configured to communicate according to the Ethernet protocol. Additionally, the network interface 650 may implement a TCP/IP stack for communication according to the TCP/IP protocols. Various alternative or additional hardware or configurations for the network interface 650 will be apparent.

The storage 660 may include one or more machine-readable storage media such as read-only memory (ROM), random-access memory (RAM), magnetic disk storage media, optical storage media, flash-memory devices, or similar storage media. In various embodiments, the storage 660 may store instructions for execution by the processor 620 or data upon with the processor 620 may operate. For example, the storage 660 may store a base operating system 661 for controlling various basic operations of the hardware 600 and instructions for implementing a method for mission-critical group call blind queuing to preempt eNB C-Plane collisions 662 and instructions for implementing a method for randomizing an inactivity timer to ensure timely mission-critical PTT to many call services 663.

It will be apparent that various information described as stored in the storage 660 may be additionally or alternatively stored in the memory 630. In this respect, the memory 630 may also be considered to constitute a "storage device" and the storage 660 may be considered a "memory." Various other arrangements will be apparent. Further, the memory 630 and storage 660 may both be considered "non-transitory machine-readable media." As used herein, the term "non-transitory" will be understood to exclude transitory signals but to include all forms of storage, including both volatile and non-volatile memories.

While the host device 600 is shown as including one of each described component, the may include multiple microprocessors that are configured to independently execute the methods described herein or are configured to perform steps or subroutines of the methods described herein such that the multiple processors cooperate to achieve the functionality described herein. Further, where the device 600 is implemented in a cloud computing system, the various hardware components may belong to separate physical systems. For example, the processor 620 may include a first processor in a first server and a second processor in a second server.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media and excludes transitory signals.

It should be appreciated by those skilled in the art that any blocks and block diagrams herein represent conceptual views of illustrative circuitry embodying the principles of the invention. Implementation of particular blocks can vary while they can be implemented in the hardware or software domain without limiting the scope of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for preempting simultaneous control plane ("C-Plane") load collisions from simultaneous user equipment ("UE") releases on a group call, the method comprising:
   determining, by an Evolved Node B ("eNB"), whether at least one of a plurality of UEs has data activity, wherein each UE in the group call is included in LTE cells that use an identical C-Plane processing pool;
   determining, by the eNB, whether a simultaneous C-Plane UE release condition has been met for the plurality of UEs;
   generating randomized values; and
   setting, by the eNB, an inactivity timer countdown value for each of the plurality of UEs using the generated randomized values over a first time interval for the inactivity timer countdown value.

2. The method for preempting simultaneous C-Plane load collisions from simultaneous UE releases on the group call of claim 1, the method further comprising:
setting, by the eNB, the inactivity timer countdown value for each of the plurality of UEs using non-randomized values allowing simultaneous release of the plurality of UEs.

3. The method for preempting simultaneous C-Plane load collisions from simultaneous UE releases on the group call of claim 1, the method further comprising:
determining, by the eNB, whether an inactivity timer has expired for each of the plurality of UEs; and
initiating, by the eNB, release of each of the plurality of UEs which have inactivity timers which have expired.

4. The method for preempting simultaneous C-Plane load collisions from simultaneous UE releases on the group call of claim 1, the method further comprising:
determining, by an eNB, whether at least one of the plurality of UEs have data activity when inactivity timers for each of the plurality of UEs have not expired.

5. The method for preempting simultaneous C-Plane load collisions from simultaneous UE releases on the group call of claim 1, wherein the simultaneous C-Plane UE release condition is when the plurality of UEs which have data activity is greater than a threshold value.

6. The method for preempting simultaneous C-Plane load collisions from simultaneous UE releases on the group call of claim 1, wherein the simultaneous C-Plane UE release condition is when the plurality of UEs are utilizing a plurality of LTE cells which are all served by the identical C-Plane processing pool.

7. The method for preempting simultaneous C-Plane load collisions from simultaneous UE releases of on the group call claim 1, wherein the simultaneous C-Plane UE release condition is when the plurality of UEs have had data activity within a second time interval.

8. The method for preempting simultaneous C-Plane load collisions from simultaneous UE releases on the group call of claim 7, wherein the second time interval is less than 500 milliseconds.

9. The method for preempting simultaneous C-Plane load collisions from simultaneous UE releases on the group call of claim 1, wherein setting the inactivity timer countdown value for each of the plurality of UEs using the generated randomized values for the inactivity timer countdown value is set by an application server to stagger release times for each of the plurality of UEs.

10. The method for preempting simultaneous C-Plane load collisions from simultaneous UE releases on the group call of claim 1, wherein the inactivity timer countdown value uses the generated randomized values over a second time interval which is greater than the first time interval, when detecting a second group call.

11. An Evolved Node B ("eNB") for preempting simultaneous control plane ("C-Plane") load collisions from simultaneous user equipment ("UE") releases on a group call, the eNB comprising:
a memory; and
a processor configured to determine whether at least one of a plurality of UEs has data activity, wherein each UE in the group call is included in LTE cells that use an identical C-Plane processing pool, determine whether a simultaneous C-Plane UE release condition has been met, generate randomized values; and set an inactivity timer countdown value for each of the plurality of UEs using the generated randomized values over a first time interval for the inactivity timer countdown value.

12. The eNB for preempting simultaneous C-Plane load collisions from simultaneous UE releases on the group call of claim 11, wherein the processor is further configured to set the inactivity timer countdown value for each of the plurality of UEs using non-randomized values allowing simultaneous release of the plurality of UEs.

13. The eNB for preempting simultaneous C-Plane load collisions from simultaneous UE releases on the group call of claim 11, wherein the processor is further configured to determine whether an inactivity timer has expired for each of the plurality of UEs; and initiate release of each of the plurality of UEs which have inactivity timers which have expired.

14. The eNB for preempting simultaneous C-Plane load collisions from simultaneous UE releases on the group call of claim 11, wherein the processor is further configured to determine whether at least one of the plurality of UEs have data activity when an inactivity timer for each of the plurality of UEs have not expired.

15. The eNB for preempting simultaneous C-Plane load collisions from simultaneous UE releases on the group call of claim 11, wherein the simultaneous C-Plane UE release condition is when the plurality of UEs which have data activity is greater than a threshold value.

16. The eNB for preempting simultaneous C-Plane load collisions from simultaneous UE releases on the group call of claim 11, wherein the simultaneous C-Plane UE release condition is when the plurality of UEs are utilizing a plurality of LTE cells which are all served by the identical C-Plane processing pool.

17. The eNB for preempting simultaneous C-Plane load collisions from simultaneous UE releases of on the group call claim 11, wherein the simultaneous C-Plane UE release condition is when the plurality of UEs have had data activity within a second time interval.

18. The eNB for preempting simultaneous C-Plane load collisions from simultaneous UE releases on the group call of claim 17, wherein the second time interval is less than 500 milliseconds.

19. The eNB for preempting simultaneous C-Plane load collisions from simultaneous UE releases on the group call of claim 11, wherein setting the inactivity timer countdown value for each of the plurality of UEs using the generated randomized values for the inactivity timer countdown value is set by an application server to stagger release times for each of the plurality of UEs.

20. The eNB for preempting simultaneous C-Plane load collisions from simultaneous UE releases on the group call of claim 11, wherein the inactivity timer countdown value uses the generated randomized values over a second time interval which is greater than the first time interval, when detecting a second group call.

* * * * *